(12) United States Patent
Prampolini

(10) Patent No.: US 6,396,173 B1
(45) Date of Patent: May 28, 2002

(54) LINEAR ACTUATOR

(75) Inventor: Silvano Prampolini, Modena (IT)

(73) Assignee: Interpump Hydraulics S.p.A. (IT)

( * ) Notice: Subject to any disclaimer, the term of this patent is extended or adjusted under 35 U.S.C. 154(b) by 2 days.

(21) Appl. No.: 09/624,220

(22) Filed: Jul. 24, 2000

(51) Int. Cl.[7] .............................. F16F 37/00; F16F 61/32
(52) U.S. Cl. ...................... 310/12; 74/15.86; 74/15.82; 74/15.8; 74/15.6; 74/11
(58) Field of Search ........................... 310/12; 318/135; 74/11, 15.6, 15.63, 15.66, 15.69, 15.8, 15.82, 15.86

(56) References Cited

U.S. PATENT DOCUMENTS

| | | | |
|---|---|---|---|
| 2,927,473 A | 3/1960 | Bentley | 74/89.42 |
| 4,498,350 A | 2/1985 | Ross | 74/89.23 |
| 5,249,474 A | * 10/1993 | Gregory | 74/15.66 |

FOREIGN PATENT DOCUMENTS

| | | |
|---|---|---|
| EP | 0727601 | 8/1996 |
| EP | 98200446 | 7/1998 |
| GB | 2066207 | 7/1981 |

* cited by examiner

*Primary Examiner*—Nestor Ramirez
*Assistant Examiner*—Judson H. Jones
(74) *Attorney, Agent, or Firm*—Hall, Priddy, Myers & Vande Sande

(57) ABSTRACT

An actuator for engaging and disengaging parts together which, during actuation may incur an obstacle to engagement, the actuator including a mechanism for incurring the obstacle and automatically stopping actuation, a mechanism for removing the obstacle to engagement and for automatically restarting actuation upon removal of the obstacle thereby to achieve engagement.

18 Claims, 2 Drawing Sheets

LINEAR ACTUATOR

This invention generally relates to actuators for bringing gears into meshing engagement. More particularly, this invention relates to such actuators which find particular, but not exclusive, utility as part of a power takeoff device attachable to the transmission of a vehicle.

BACKGROUND OF THE INVENTION

The mechanical arts have universally had to face the problem of how to successfully bring two rotatable gears, selectively, into and out of gear meshing engagement, such that both gears when engaged will then operate (rotate) together when desired, to do some form of useful work, normally one gear driving the other. One environment in which this problem has had to be faced and solved if the device is to be commercially acceptable and safe to employ, is in the well known art of power takeoff devices (herein referred to by their industry acronym "PTO's"). PTO's have found commercial uses in a wide variety of areas, such as in the vehicular arts where the PTO is attached to the transmission of the vehicle for translating the power of the engine into the rotation of a shaft for doing useful work auxiliary to the vehicle itself (e.g. operating a hydraulic pump for raising and lowering a dump truck bed, compacting a garbage compactor, and the like).

In order to perform their assigned tasks PTO's are generally formed of an arrangement of gears associated with an output shaft and a mechanism for selectively engaging and disengaging one of the gears in the PTO with another gear in the PTO which is constantly engaged with a corresponding gear in, for example, the transmission of the vehicle. Since it is highly undesirable in most instances to have the PTO output shaft constantly rotating, various devices have been developed in the art for effecting, selectively, the aforesaid engagement and disengagement, whether the PTO be attached to a vehicle (truck, tractor, etc.) or to some other power driven device (e.g. stationary engine rig).

In the normal situation experienced in the PTO art, meshing engagement and/or disengagement of the gear(s) of the PTO is generally achieved by axially displacing the operative PTO gear with respect to its input gear. Axial displacement for meshing engagement or disengagement (with the gears at rest, i.e., without synchronization) is usually achieved by means-of mechanical actuators, which may be pneumatically or electrically (and less often manually) operated.

There are certain known drawbacks to the actuators currently in use. For example, certain electrically operated actuators employ solenoids which are rather large and space consuming and provide a limited amount of actuation travel. Certain other electrical actuators use electric motors which actuate screw transmissions having or requiring bearing recirculation and/or which are operated by complex electronic control circuits. For example, to mesh the gears requires a "dosed" sequential execution having a very precise succession of operative phases (or steps). In certain prior art devices, furthermore, the axially movable gear (wheel) must be brought into contact with an axially fixed gear and thereafter maintained in pressed contact against the fixed gear until, by the effect of relative rotation, the gear teeth of the two gear wheels are caused to coincide (i.e., enter into the inter-gear spaces of the other) thus achieving operative meshing engagement. Moreover, in order to carry out the above-described phases (steps), special operations have to be put in place. For example, the use of a screw transmission with,bearing circulation may have to be employed, as well as a fine and sophisticated adjustment of the electric motor through the use of a complex and expensive control circuit employed to actuate it.

In another known type of actuator, an electric motor is employed to draw in, by rotation and usually with an axially slidable, geared coupling, an axially-slidable intermediate rotating body. In such a device a nonrotatable screw coupled with a lead screw bored coaxially into the intermediate body, functions as the moving part of the actuator. In this configuration, the positioning of the intermediate body in the direction of mesh is not rigid. Rather it is governed or controlled by an intermediately located, specially calibrated spring. If meshing is accomplished, the screw in the intermediate body becomes immediately locked and the body acts rigidly on a slidable rod to directly command an appropriate "endrun" switch to actuate and stop the motor. If meshing is not achieved (i.e., is messed), the intermediate body is caused to retreat from the meshed position. When and if complete meshing is achieved, the screw head retreats with respect to the intermediate body, eventually terminating travel by acting directly on another "endrun" switch which, again, deactivates the electric motor.

The drawbacks to these known devices are known and generally include, as their main drawback, the fact that the alignment of the parts for actuating the switches must be of such preciseness that repeatability becomes unreliable.

It is apparent from the above that there exists a need in the art for an actuator which overcomes or at least minimizes the above-described drawbacks endemic to prior actuators, as above-described. Preferably, such an actuator would also be simple to operate, economical in its simplicity of parts, and yet reliable in its operation. It is a purpose of this invention to fulfill this and other needs in the art apparent to the skilled artisan once given the following disclosure.

SUMMARY OF THE INVENTION

Generally speaking this invention fulfills the above needs in the art by providing:

an actuator comprising a frame and a rotatable intermediate body freely rotatable with respect to the frame and provided with an externally toothed gear wheel meshingly engaged with a pinion fixed to an end of a shaft of an electric motor, the rotatable intermediate body being further provided with a lead screw area extending therewithin and arranged coaxially thereto; the intermediate body being capable of moving axially in either direction over a predetermined distance which distance is sufficiently limited in length so as to maintain the meshing engagement between the externally toothed wheel and the pinion; the actuator further comprising a spring operatively located coaxially between the frame and the intermediate body, a screw shaft member coaxially and screwably coupled with the lead screw area and which has a first end connected to the frame by a coupling member which prevents relative rotation while allowing free axial movement, a switch means for operating the electric motor, the switch means being actuatable by the intermediate body upon relative movement of the intermediate body. In preferred embodiments the intermediate body is not mechanically rigidly connected to the switch means.

In certain particularly preferred embodiments of this invention, the aforesaid actuator is operatively coupled to a power takeoff device for selectively engaging and disengaging the input gear of the power takeoff device with its output shaft.

This invention will now be described with respect to certain embodiments thereof as illustrated in the following drawings wherein:

IN THE DRAWINGS

DETAILED DESCRIPTION OF THE INVENTION

Figure 1:
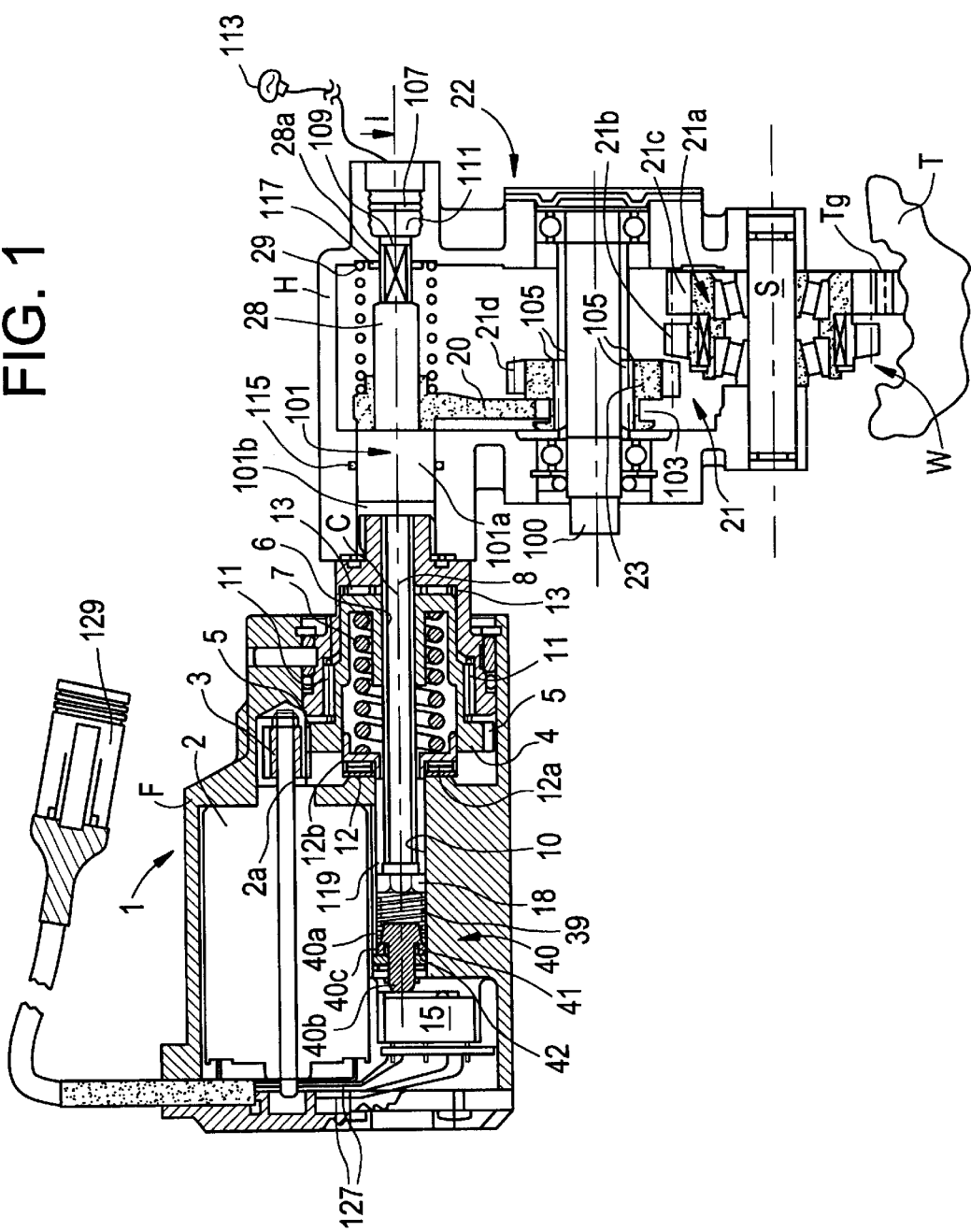
FIG. 1 is a side sectional view of an embodiment of an actuator according to this invention when coupled to a conventional PTO in its disengaged position; the PTO in turn being coupled via its input gear to the output gear of a conventional transmission.

With reference to the drawings, and initially with particular reference to FIG. 1, there is presented an actuator 1, which constitutes an embodiment of this invention, connected to a conventional power takeoff (PTO) device 22 which in turn is connected to a typical transmission T (e.g. of a truck). It will be understood in this respect that the figures are not dimensionally accurate with respect to the relative size of actuator 1 as compared to PTO 22, and that only the operative output gear Tg of transmission T (and only a portion of T's housing) is shown for convenience. Actuator 1 has been enlarged in FIG. 1 so that its internal mechanisms can be more clearly illustrated. In actual practice it will be made as small as feasible to conserve space and for economy of cost. Moreover, it is also understood that the PTO illustrated is only representative of a wide variety of types and sizes of PTO's to which the actuators of this invention may be operatively applied. In this respect, PTO 22 as illustrated is a conventional PTO well known in the art. Schematically and only partially illustrated, conventional transmission "T" is likewise presented for illustrative purposes only. Other types of transmissions or indeed, non-transmission driving mechanisms are contemplated within the scope of this invention. In addition, the actuators of this invention find utility in the gear meshing art generally and are not limited to their use in association with PTO's. However, because of the high utility of the actuators of this invention for use in operating PTO's in the truck art (e.g. operating hydraulic pumps associated with dump trucks, garbage compactor trucks, snowplows, spreaders, and the like) such an environment is a preferred one for the purposes of this invention.

To best explain the embodiment of this invention as illustrated in FIG. 1, attention is first directed to PTO 22, a conventional type of PTO used, for example, throughout the trucking industry. PTO 22 includes the usual housing "H" which, in a known manner, is connected to transmission T through window "W" in the transmission housing and which is provided by the transmission manufacturer for that purpose. Characteristically, the window, when opened, exposes the requisite transmission gear Tg for operating PTO 22.

PTO 22 is provided with an input gear mechanism generally shown at 21a which includes laterally spaced cojoined gear (toothed) wheels 21b and 21c, respectively, and which are rotatable about or with common shaft S. PTO 22 further includes output shaft 100, which is the shaft when rotated that performs the intended auxiliary work (e.g. operates a hydraulic pump for raising a dump bed of a truck, etc.). As is known in the art, it is highly undesirable in most PTO operations, particularly in the truck art, for shaft 100 to be continuously rotating for lengthy periods of time. This in turn gives rise to the need for an actuator which can effectively engage and disengage shaft 100 for rotation or nonrotation as desired. This invention fulfills this need as now demonstrated with reference to the embodiment of FIGS. 1–2.

With specific reference to FIG. 1, conventional gear teeth 21c of PTO 22 are in continuous meshing engagement with the teeth of gear Tg of a transmission T (e.g. of a truck engine) and thus gear 21a (as well as gear teeth 21b) will rotate whenever transmission gear Tg rotates (which in the usually truck environment is whenever, for example, the truck engine is operating and the clutch is not depressed). To prevent unwanted rotation of output shaft 100, there is provided on shaft 100 (e.g. as by splinning 105) a gear (toothed) wheel 23 having teeth 21d which teeth are designed to be capable of meshing engagement with teeth 21b. Wheel 23 is further provided with a slot (circumferential groove) 103 for accommodating one end of actuator arm 20. This end of actuator arm 20 is designed along with slot 103 to allow wheel 23 to freely rotate without rotating actuator arm 20, but to allow the end of actuator arm 20 located in slot 103 to alternately be brought into abutting engagement with one of the lateral walls of the slot (i.e. those perpendicular to shaft 100) for axial shifting of gear teeth 21d into and out of meshing engagement with teeth 21b of input gear wheel 21a. In this respect, such axial shifting of wheel 23 along shaft 100 is accomplished by appropriately designed glide splines 105. When not in an axial shifting mode, arm 20, as shown in FIG. 1, preferably does not touch any of the walls, bottom or sides, its dimensions in this respect being less than those of the slot.

The other end of actuator arm 20 is rigidly connected to end 28 of shaft 101 which is normally biased by concentric coil spring 29 to the nonengaging position of PTO 22 (as shown in FIG. 1). In this respect, shaft 101 is conveniently formed of a large head end 10a from which extends a section 28 of lesser diameter to which arm 20 is connected and which finally terminates in a section 28a of still smaller diameter. Extending in the path of end section 28a and secured in orifice 109 of PTO 22 is a striker (stop mechanism) 107 for stopping the advancement of shaft 101. Orifice 109 enlarges at 111 to accommodate the striker 107. Orifice 109, as well as, has provided in it a positive indicator switch (not shown), threadedly engaged therein, which is activated by end section 28a contacting striker 107 thereby to turn on warning light 113 when the PTO is in its operating (engaged) mode. In the truck arts this warning light is normally located in the cab of the vehicle in close proximity to the switch or lever (not shown) in the cab which actuates motor 2.

Enlarged head end 101a is held in sliding engagement in its PTO housing orifice 101b which includes an O-ring seal 115. Striker 107 is retained in housing orifice 111 sealed by a sealing ring 117 provided in the housing, sealing the interface between the housing and shaft end 28a. In conventional fashion, as shown, shaft 100 of the PTO is also provided with conventional seals and bearings as illustrated.

Attention is now directed to actuator 1 shown in FIG. 1 which, as aforesaid, is on embodiment of an actuator as contemplated by this invention. Actuator 1 includes a frame or housing "F" which houses the various components of the actuator and provides various orifices for the moving parts as well as abutting stop walls for the biasing coil springs, all as illustrated in FIG. 1.

Housing F has located therein a conventional dc electric motor 2 provided with a shaft 2a, which has mounted thereon toothed gear pinion 3 to be rotated by shaft 2a when motor 2 is operated.

An externally crowned (i.e., gear toothed) wheel 5 is provided at the innermost end of (and as an integral part of) intermediate rotatable body 4. The teeth of wheel 5 are meshingly engaged with their counterpart gear teeth in pinion 3. Rotatable body 4 is freely supported for rotation in housing F by roller bearings 11. Body 4 and its wheel 5, in this respect, are arranged for coaxial rotation about their common centerline "C". Internal wall portion 6 of body 4 is provided with a lead screw thread area into which shaft 8 having a complementary screw thread on its external surface is threadably engaged and retained thereby for axial extension and retraction depending on the rotational direction of shaft 2a. Stated another way, shaft 8, through the aforesaid screw thread arrangement will move axially in one or the other direction when motor 2 is operated in one or the other direction respectively.

Coil spring 7, of predetermined calibration, is provided coaxially about the inner walls of body 4 and shaft 8 so as to extend and create a biasing force between thrust bearing 12 and thrust washer 12a and the end of body 4 opposite thrust bearing 12. At this opposite end of body 4 there is provided further thrust bearings 13 such that the effect of coil spring 7 is to resiliently retain body 4 in its illustrated position so as to insure axial displacement of shaft 8 whenever motor 2 is operated. Retaining spring 7 is provided at one of its ends with an "S" shaped cup member 12b whose innermost horizontal flange terminates in housing orifice 119 having an internal wall 10.

Screw shaft 8 is provided at one end thereof with a hexagonal head 18 located internally of sliding guide wall 10, which, of course, is or may at least be considered part of housing F. Head 18 is designed to allow enough clearance between it and wall 10 of orifice 119 for ease of sliding as well as rotation, but not so much clearance as to allow for undue vibration or radial oscillation of shaft 8. The lower horizontal end of S-shaped cup member 12b terminates well prior to hex head 18 so as not to interfere with any portion of the full, preselected amount of axial travel of shaft 8. In other words, shaft 8 should be free to move axially (i.e. rotatably retract and extend via its screw threads) in order to properly and effectively actuate PTO 22 by complete or substantially complete meshing engagement of teeth 21d with teeth 21b, but at the same time, not be so loose radially as to allow undue oscillation within orifice 119 which might injure or deteriorate the screw thread connection between shaft 8 and internal wall 6.

At the end of hex head 18 opposite that end connected to shaft 8, there is located a coaxial coil spring 39 having substantially the same outer diameter as (i.e., slightly lesser than) the internal diameter of housing orifice 119. Coil spring 39 is compressed between hex head 18 and lower flange 40c of activator element 40. In order to actuate motor 2, T-shaped switch activator 40 (i.e. an endrun pivot or piston) is located concentrically in orifice 119 within coil spring 39. Activator 40 is preferably formed of an enlarged head end 40a and a shaft portion 40b ending as aforesaid in outwardly extending flange 40c. Striker 42 is provided in housing wall F onto which flange 40c is biased by coil spring 18. Between striker 42 and enlarged head end 40a there is located a second biasing coil spring 41.

Electric motor 2 is operated by switch 15 which in turn is operated remotely from, for example, the cab of a vehicle (not shown) through control wires 127 and operating control plug 129.

To engage PTO shaft 100 for rotation when the device is in its disengaged mode as shown in FIG. 1, rotation of gear Tg (if it is rotating) is stopped (e.g. as by depressing the clutch in a non-automatic transmission of a vehicle). Electric switch mechanism 129 is then operated to signal motor 2 to rotate in the engage direction. Shaft 2a then operates to drive gear pinion 3 which in turn rotates intermediate body 4. This causes shaft 8 to unscrew and contact head end 101a of shaft 101. Shaft 101 then moves against the bias of coil spring 29, moving actuator arm 20 into engagement with a sidewall of slot 103 in wheel 23.

Wheel 23 is then caused to advance along splines 105 on output shaft 100 until teeth 21d are brought into meshing engagement with teeth 21b of PTO input gear mechanism 21a. When the clutch is then released, or Tg gear is again otherwise allowed to rotate (by whatever mechanism) output shaft 100 rotates, and is available for useful work. Striker portion 107, now contacted by the end of portion 28a of shaft 101 has been caused at this point through a conventional spring mechanism (not shown) to activate positive indicator switch 111, turning on warning light 113 to indicate that PTO 22 is engaged.

Figure 2:
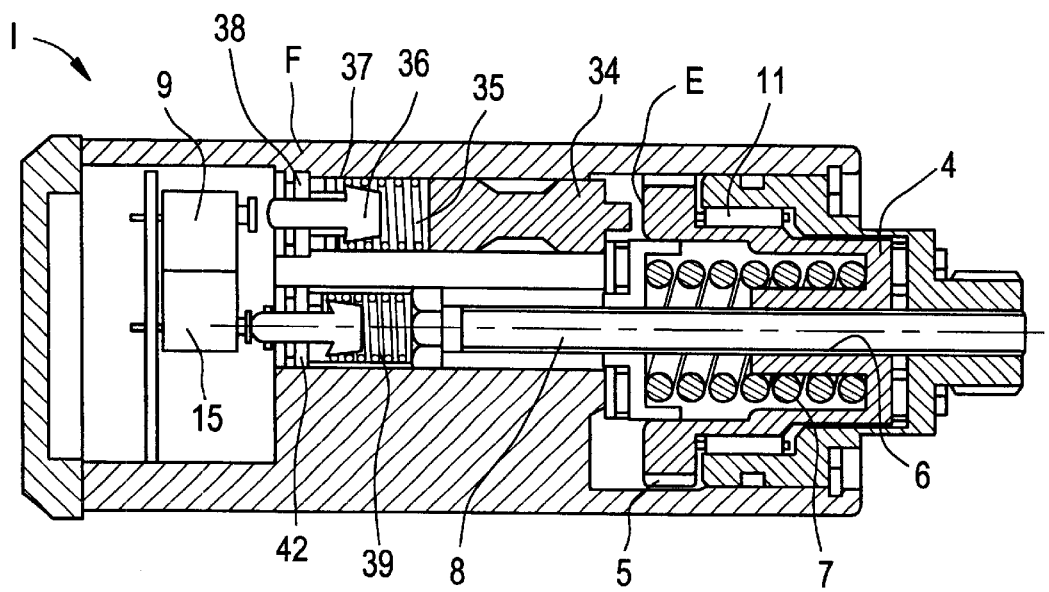
FIG. 2 is a top plan, sectional view of the actuator of FIG. 1.

The extent of travel of shaft 8 and thus shaft 101 during the "engage" mode is limited by the actuation of an endrun switch 9 (shown in FIG. 2) which turns motor 2 off. This is accomplished by the use of a predetermined compressed position of spring 7. As can be seen in FIG. 2, body 4 acts only indirectly on switch 9 through an elastically deformable cushioning mechanism moved in a parallel direction to the axis of rotation of body 4 itself. This mechanism comprises a mobile elastomeric spacer 34, a first elastically deformable element or spring 35, an endrun pivot (i.e., piston) 36 which eventually is brought into direct contact with switch 9, and a second elastically deformable element or counteracting spring 37. Each of these elements, as illustrated, is aligned and slidable axially in housing F.

Spacer 34 is provided with an end which is aligned so as to come into direct contact with the forward end of body 4. Spring 35 is located to operate between spacer 34 and endrun pivot 36. Counteracting spring 37 is located to operate between endrun pivot 36 and striker 38 which is fixed to housing F. Spring 35 is more rigid (i.e. stiffer) than counteracting spring 37 and is coaxial therewith. As can be seen endrun switch 9 will be activated (to turn motor 2 "off") each time (due to movement of body 4) that spring 35 pushes pivot 36 against switch 9, overcoming the opposite biasing force of spring 37. In this way the action of endrun pivot 36 on switch 9 is both gentle and gradual (i.e., cushioned) and is not adversely affected by the inertia of the system which inevitably permits neither instantaneous arrest of the rotation of body 4 nor a precise axial repositioning thereof at every cycle. In short, the presence of the cushioning mechanism assures that these potentially adverse effects are "absorbed" without them being transmitted to endrun pivot 36, thus protecting switch 9.

In this way then, the advance of shaft 8 and thus shaft 101 is accurately controlled. As shaft 8 advances in one direction to actuate PTO 22, intermediate body 4 advances (i.e., retreats) in the opposite direction against the biasing force of spring 7 until the end "E" of body 4 contacts spacer 34 and retreats far enough to cause pivot (plunger) 36 to contact and activate switch 9, turning off motor 2 (and thus stopping the advance of shafts 8 and 101). The system is designed so that at the point motor 2 is turned off, PTO 22 is effectively operating and all relevant, intended gears are in full or substantially full engagement, effectively retained as such by the mechanics of the system as described. In addition, end 28a has contacted striker 107 and warning light 113 has been activated.

Disengagement of PTO 22 now requires a reverse operation. Again, Tg gear is caused to stop rotating (e.g. by depressing the clutch of the vehicle). The "disengage" lever or button (not shown) is then activated to cause motor 2 to rotate in the opposite direction. Shaft 8 begins to retract (via the screw thread mechanism at 6 between shaft 8 and body 4) while body 4 moves in the opposite direction away from contact with spacer 34. Plunger 36 moves out of contact with switch 9, while hex head end 18 of shaft 8 via the cushioning mechanism of coil springs 39, 41, causes activator element (plunger) 40, to eventually contact and activate endrun switch 15 which stops motor 2, thus stopping the retraction of screw shaft 8 (designed so it is fully retracted when motor 2 is stopped). By the time, however, that switch 15 is contacted (FIGS. 1 and 2), PTO 22 has become deactivated (see FIG. 1) because actuator arm 20, via the uncoiling biasing force of coil spring 29 (compressed when PTO 22 was engaged) has moved in the opposite direction to contact the opposite sidewall of slot 103 and move (retract) gear wheel 23 along splines 105 until teeth 21*d* are fully retracted from, i.e., fully out of meshing engagement with, gear teeth 21*b* (as shown in FIG. 1). Rotation of gear Tg such as by release of the clutch will then not cause rotation of PTO output shaft 100.

In order to better describe the cushioning effect upon contact with switch 15 which is achieved when shaft 8 is retracted, and as shown in FIGS. 1–2, a cushioning mechanism is provided, and which is aligned and guided to slide axially one element with the other, the mechanism comprising an elastically deformable element or spring 39, an endrun pivot 40 and an elastically deformable element or counteracting spring 41. Counteracting spring 41 is located to operate between endrun pivot 40 and striker 42 (FIG. 2) attached to frame F. Similarly, as described above with respect to the elements which cushion the contact force experienced by switch 9, these similar elements associated with the end of shaft 8 serve to cushion the contact force experienced by switch 15. In short, the presence of spring 39 enables the adverse effects described above that otherwise would be transmitted to switch 15 during contact, to be "absorbed" and thus to protect switch 15 in a similar way that switch 9 was protected.

The "engage" or "disengage" mode of operation may be effected by any convenient technique such as by a switch, lever, or button mechanism conveniently located, such as in the cab of a dump truck in close proximity to the driver. The warning light 113 is also locatable in any visible, convenient location which will be noticeable by the driver such as on a conventional console near his operating hand or on the dashboard panel.

As can be seen, if during the engagement operation or mode, the gear teeth on wheel 23 are precisely (perfectly) synchronized with respect to the inter-gear teeth gaps on wheel 24, meshing engagement occurs without any problem. On the other hand, in the statistically rather frequent situation where the teeth of wheel 23 are not in perfect synchronization with the inter-gear gaps of the teeth of wheel 24, meshing engagement will not be accomplished. In such an instance axial advancement of screw shaft 8 stops and body 4 continues to rotate and move with respect to screw shaft 8, thus compressing coil spring 7. This, in turn, brings end E of body 4 into contact with spacer 34, which forces pivot plunger 36 into contact with switch 9, stopping motor 2.

This activation of switch 9 when meshing engagement is not achieved does not, however, necessarily produce an instantaneous lock (blockage) of the whole kinematic chain of the mechanism. Instantaneous stoppage of movement of spacer 34 in the same position is not possible. An overrun does occur. The interposition of spring 35 as illustrated allows spacer 34 to stop anywhere without rigidly acting on endrun pivot (plunger or piston) 36. This, then safeguards switch 9. In other words, the inevitable overrun is "absorbed" by the elastic deformation of spring 35, with no other consequences as previously described.

There, of course, exists the need when meshing engagement has not been achieved and the above mechanism activated so that motor 2 was automatically turned off, to eventually achieve the desired meshing engagement. This is rather easily accomplished because when motor 2 has been automatically turned off, screw shaft 8, due to the screw threads, maintains actuator arm 20 in its position and thus keeps gear wheel 23 against gear wheel 24 with a maximum force determined by the axial biasing force of coil spring 7. This keeps the system under a predetermined axial force without there being any dissipation of energy due to the motor being shut off.

To achieve full meshing engagement with the system in this position, then, the operator need only activate a small (short) rotation of gear wheel 24 with respect to gear wheel 23 until precise synchronization (i.e. whatever degree of synchronization is needed to achieve meshing engagement) is realized. Wheel 23 is, at this time being biased in the direction of meshing engagement by spring 7. When the degree of synchronization needed to achieve meshing engagement is realized, spring 7's expansion causes engagement to occur. This action also withdraws end "E" of body 4 from spacer 34 causing, via springs 35, 37, plunger (endrun pivot) 36 to retract from switch 9, turning motor 2 on to complete the meshing operation. Engagement (shaft 8 extension) terminates when end portion 28*a* of shaft 101 contacts stop striker 107 secured in the PTO wall, which stops further movement of shaft 101 and causes body 4 to move axially until the end "E" of body 4 once again comes in contact with spacer 34 and pushes it far enough so that piston 36 contacts switch 9 to shut off motor 2. At this point engagement of PTO 22 is now complete and PTO output shaft 100 may be rotated to do useful work (i.e., by reactivating the rotation of gear Tg). Disengagement when desired is achieved by stopping the Tg gear, activating motor 2 in the "disengage" direction, whereby disengagement occurs as aforesaid until switch 15 is activated by actuator element (piston) 40 to turn motor 2 off.

It is worth noting at this point that the system is a flexible one in that the positioning of the end 28*a* of shaft 101 and switch 9 may be varied or adjusted so that actuator 1 can accommodate various power takeoffs having different lengths (distances) of meshing engagement as well as for those specific applications other than PTO's for which an actuator is required which automatically stops its own action when a resistance to further actuation is experienced, then to resume its action, also automatically when that resistance no longer is present.

By the appropriate choice of spring 7's characteristics, establishment of the desired axial forces for a given system on the basis of optimal operation can be achieved and is well within the skill of the ordinary artisan using no more than simple routine calculation or experimentation, once given this disclosure. In this respect it is here again pointed out that during disengagement, by effect of the reverse direction of rotation of motor 2, screw shaft 8 retreats, gradually disengaging wheel 23 from wheel 24. This retreat occurs until the head of screw shaft 8 via spring 39 forces endrun piston (pivot) 40 to activate switch 15 to stop motor 2. Springs 39 (and 41) will be designed accordingly, of course, to achieve this desired afore-described purposes, which includes, of course, the achievement of the aforesaid cushioning (absorbing) effect to protect against the overrun of head end 18 that may inevitably occur.

Figure 3:
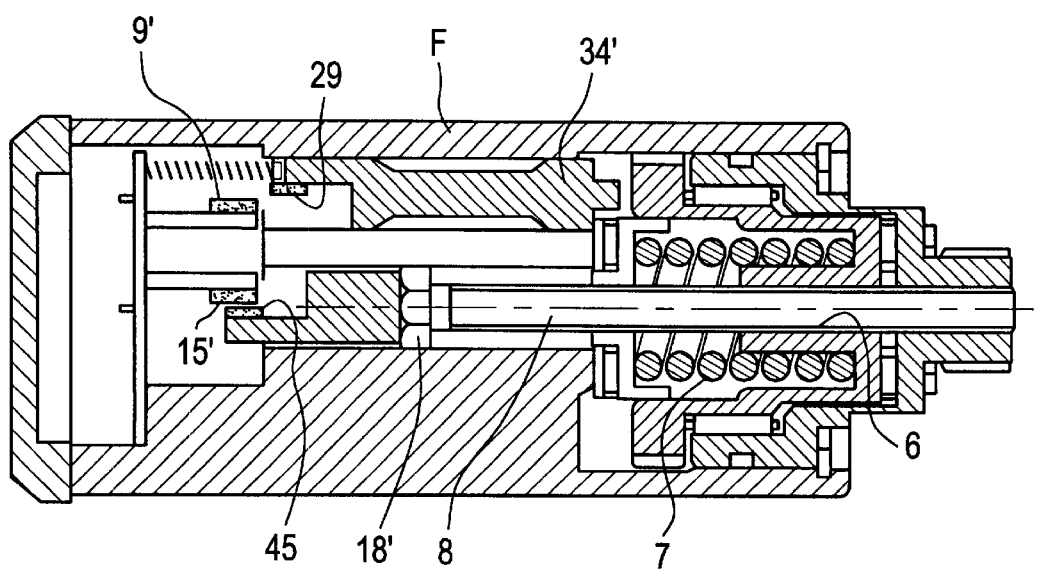
FIG. 3 is a top plan, sectional view of another embodiment of this invention.

Turning now to FIG. 3, a second embodiment of this invention is illustrated. Here, in place of switches 9 and 15 in the first embodiment (FIGS. 1–2), magnetically activated switches 9' and 15' are provided. Here, also, to the ends of spacer 34' and head end 18' (corresponding to spacer 34 and 18, respectively, in the embodiment of FIGS. 1–2) are attached actuation elements 29 and 45, such as, for example, comprised of small magnets. Elements 29 and 45 are arranged so as to be freely movable in a direction parallel to the actuator's axis C'. Such elements may be located in various positions, in this respect, relative to the switches 9' and 15' preferably so that the interaction is of an electromagnetic nature only rather than of a physical contact.

Once given the above disclosure many other features, modifications and improvements will become apparent to the skilled artisan. For example, apart from its use as an actuator for PTO's, the actuators of this invention can be used in a wide variety of applications. Illustrative of this, is where the actuators herein may be used to actuate mechanisms for opening or closing gates of many types such as where the opening and closing motion must be stopped from time to time (from only occasionally to always) when the operation encounters a force which is superior to a predetermined limit value. Such other features, modifications and improvements are considered to be a part of this invention, the scope of which is to be determined by the following claims:

I claim:

1. An actuator comprising a frame and a rotatable intermediate body freely rotatable with respect to said frame and provided with an externally toothed gear wheel meshingly engaged with a pinion fixed to an end of a shaft of an electric motor, the rotatable intermediate body being further provided with a lead screw area extending therewithin and arranged coaxially thereto; the intermediate body being capable of moving axially in either direction over a predetermined distance which distance is sufficiently limited in length so as to maintain the meshing engagement between the externally toothed wheel and the pinion; the actuator further comprising a main spring operatively located coaxially between the frame and the intermediate body, a screw shaft member coaxially and screwably coupled with said lead screw area and which has a first end connected to the frame by a coupling member which prevents relative rotation while allowing free axial movement, a switch means for operating said electric motor, said switch means being actuatable by said intermediate body upon relative movement of said intermediate body and wherein said intermediate body is not mechanically rigidly connected to said switch means.

2. An actuator comprising a frame and a rotatable intermediate body freely rotatable with respect to said frame and provided with an externally toothed gear wheel meshingly engaged with a pinion fixed to an end of a shaft of an electric motor, the rotatable intermediate body being further provided with a lead screw area extending therewithin and arranged coaxially thereto; the intermediate body being capable of moving axially in either direction over a predetermined distance which distance is sufficiently limited in length so as to maintain the meshing engagement between the externally toothed wheel and the pinion; the actuator further comprising a main spring operatively located coaxially between the frame and the intermediate body, a screw shaft member coaxially and screwably coupled with said lead screw area and which has a first end connected to the frame by a coupling member which prevents relative rotation while allowing free axial movement, a switch means for operating said electric motor, said switch means being actuatable by said intermediate body upon relative movement of said intermediate body and wherein said intermediate body is not mechanically rigidly connected to said switch means; and wherein said actuator is a linear actuator which further includes an elastically deformable mechanism located between said switch means and said intermediate body and wherein said switch means is actuated by movement of said intermediate body into contact with said elastically deformable mechanism.

3. A linear actuator according to claim 2 wherein said elastically deformable mechanism is elastically deformable in a direction parallel to the axis of rotation of said intermediate body.

4. A linear actuator according to claim 3 wherein said elastically deformable mechanism includes a cushioning spacer, a first cushioning spring, an endrun pivot and a second cushioning counteracting spring; said spacer having an end which is predisposed to come into direct contact with a forward portion of said rotating intermediate body; said first spring being operative located between said mobile spacer and said endrun pivot; said counteracting spring being operatively located between said endrun pivot and a stop member fixed to said frame and wherein said cushioning members are axially aligned in series one with the other.

5. A linear actuator according to claim 4 wherein said first spring is stiffer than said second spring, each said first and second spring acting coaxially with respect to the other.

6. A linear actuator according to claim 5 wherein said frame includes a guide orifice in which said screw shaft axially moves, wherein said screw shaft has a first end and a second end for actuating extension external to said actuator, and wherein said first end includes a hexagonal head end of a size sufficient to act as a sliding guide member within said orifice for said screw shaft.

7. A linear actuator according to claim 5 wherein said switch means is located so as to be activated when said intermediate body has reached the extremity of its travel in one direction at which extremity said main spring exerts a predetermined axial force.

8. A linear actuator according to claim 5 wherein said switch means includes a switch activatable by one end of said screw shaft when in its maximum retracted position within said actuator, and wherein there is located between said shaft end and said switch an elastically deformable mechanism which protects said switch from overretraction of said screw shaft.

9. A linear actuator according to claim 8 wherein said elastically deformable mechanism deforms in a direction parallel to the axis of said screw shaft.

10. A linear actuator according to claim 9 wherein said elastically deformable mechanism comprises an elastic cushioning spacer, a first cushioning spring, an endrun pivot, and a second cushioning counteracting spring, said first cushioning spring being operatively located between the head end of said screw shaft and said endrun pivot, wherein said second counteracting spring is operatively located between said endrun pivot and a striker attached to said frame of said actuator, said first cushioning spring, said endrun pivot, and said second counteracting spring being serially and axially aligned one with respect to the other.

11. A linear actuator according to claim 7 wherein said switch means is actuated by an actuating element connected proximal one end of a moveable spacer, the other end of said moveable spacer being located so as to directly contact a front portion of said intermediate body, said actuating element being moveable in a parallel direction to the rotational axis of said intermediate body, said actuating element being located and designed to be freely moveable to a position a short distance from said switch without mechanically contacting said switch during said movement.

12. A linear actuator according to claim 11 wherein said switch means includes a return endrun switch actuable by said screw shaft when in its maximum retracted position.

13. A linear actuator according to claims 5 or 12 wherein said switch means is actuated by an actuating element which is connected to a support fixed to the head of said screw shaft; said actuating element being located so as to be freely movable a short distance from said switch without mechanically contacting said switch during said movement.

14. A linear actuator according to claim 1 wherein said switch means includes a return endrun switch actuable by said screw shaft when in its maximum retracted position.

15. A linear actuator according to claim 1 wherein said switch means includes a return endrun switch actuable by said screw shaft when in its maximum retracted position; and wherein said switch means is actuated by an actuating element which is connected to a support fixed to the head of said screw shaft; said actuating element being located so as to be freely movable a short distance from said switch without mechanically contacting said switch during said movement.

16. A linear actuator according to claim 1 wherein said switch means is actuated by an actuating element connected proximal one end of a moveable spacer, the other end of said moveable spacer being located so as to directly contact a front portion of said intermediate body, said actuating element being moveable in a parallel direction to the rotational axis of said intermediate body, said actuating element being located and designed to be freely moveable to a position a short distance from said switch without mechanically contacting said switch during said movement;

wherein said switch means includes a return endrun switch actuable by said screw shaft when in its maximum retracted position; and wherein said switch means is actuated by an actuating element which is connected to a support fixed to the head of said screw shaft; said actuating element being located so as to be freely movable a short distance from said switch without mechanically contacting said switch during said movement.

17. In the combination of a power takeoff device having a rotatable output shaft connectable with an input gear for rotating said output shaft, and an actuator for engaging and disengaging said output shaft with and from said input gear, the improvement comprising an actuator comprising a frame and:a rotatable intermediate body freely rotatable with respect to said frame and provided with an externally toothed gear wheel meshingly engaged with a pinion fixed to an end of a shaft of an electric motor, the rotatable intermediate body being further provided with a lead screw area extending therewithin and arranged coaxially thereto; the intermediate body being capable of moving axially in either direction over a predetermined distance which distance is sufficiently limited in length so as to maintain the meshing engagement between the externally toothed wheel and the pinion; the actuator further comprising a main spring operatively located coaxially between the frame and the intermediate body, a screw shaft member coaxially and screwably coupled with said lead screw area and which has a first end connected to the frame by a coupling member which prevents relative rotation while allowing free axial movement, a switch means for operating said electric motor, said switch means being actuatable by said intermediate body upon relative movement of said intermediate body and wherein said intermediate body is not mechanically rigidly connected to said switch means.

18. An actuator comprising a frame and a rotatable intermediate body freely rotatable with respect to said frame and provided with an externally toothed gear wheel meshingly engaged with a pinion fixed to an end of a shaft of an electric motor, the rotatable intermediate body being further provided with a lead screw area extending therewithin and arranged coaxially thereto; the intermediate body being capable of moving axially in either direction over a predetermined distance which distance is sufficiently limited in length so as to maintain the meshing engagement between the externally toothed wheel and the pinion; the actuator further comprising a main spring operatively located coaxially between the frame and the intermediate body, a screw shaft member coaxially and screwably coupled with said lead screw area and which has a first end connected to the frame by a coupling member which prevents relative rotation while allowing free axial movement, a switch means for operating said electric motor, said switch means being actuatable by said intermediate body upon relative movement of said intermediate body and wherein said intermediate body is not mechanically rigidly connected to said switch means; and wherein said switch means is actuated by an actuating element connected proximal one end of a moveable spacer, the other end of said moveable spacer being located so as to directly contact a front portion of said intermediate body, said actuating element being moveable in a parallel direction to the rotational axis of said intermediate body, said actuating element being located and designed to be freely moveable to a position a short distance from said switch without mechanically contacting said switch during said movement.

* * * * *

UNITED STATES PATENT AND TRADEMARK OFFICE
CERTIFICATE OF CORRECTION

PATENT NO. : 6,396,173 B1
DATED : May 28, 2002
INVENTOR(S) : Prampolini

It is certified that error appears in the above-identified patent and that said Letters Patent is hereby corrected as shown below:

Column 1,
Line 46, after "means", delete "-".

Column 2,
Line 1, after "with", delete ",".

Column 4,
Line 60, delete "on", and insert "an".

Signed and Sealed this

Twenty-fourth Day of September, 2002

*Attest:*

JAMES E. ROGAN
*Attesting Officer*     *Director of the United States Patent and Trademark Office*